United States Patent Office 2,908,288
Patented Oct. 13, 1959

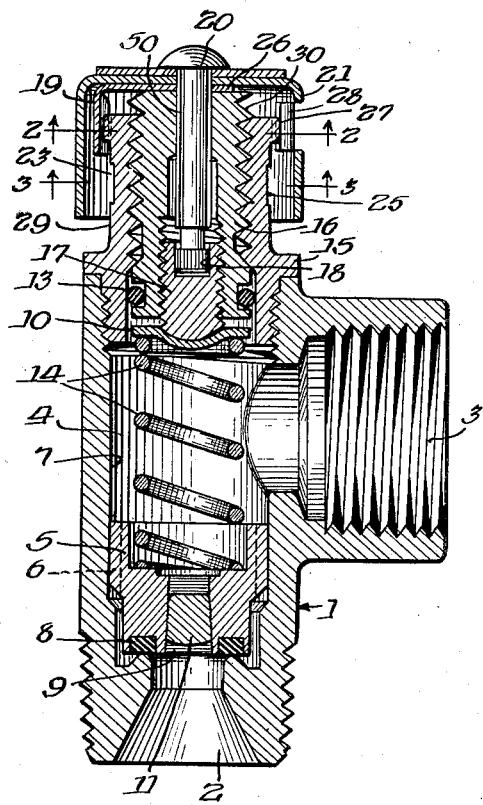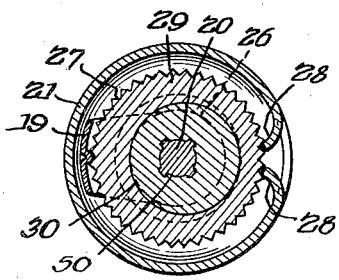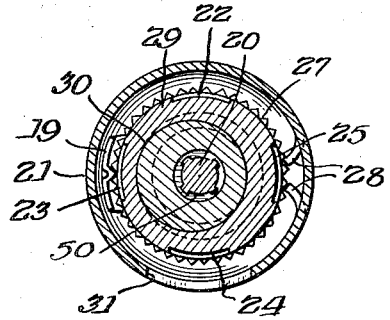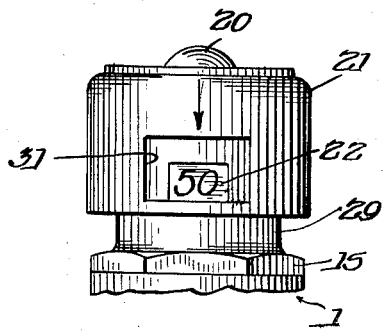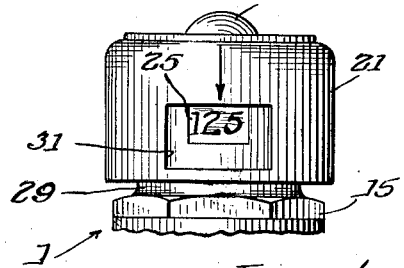
Inventors.
Edward W. Carr, &
George E. Hansen.
By Joseph O. Lange
Atty.

2,908,288

CALIBRATED RELIEF VALVE

Edward W. Carr, Cicero, and George E. Hansen, Elmwood Park, Ill., assignors to Crane Co., Chicago, Ill., a corporation of Illinois Application April 13, 1955, Serial No. 501,043

7 Claims. (Cl. 137—540)

This invention relates generally to a calibrated relief valve or safety valve, and, more particularly, it is concerned with such type of valve in which the ultimate pressure adjustment may be made conveniently in the field or installation situs.

It should be understood that one of the objections to present relief or safety valves has been the difficulty of obtaining or conveniently regulating relief or safety valves properly set for the many variable conditions encountered in the field. Valves of this invention are adjusted or set in the field for a particular fluid pressure, such as 50, 75, 100 or 125 pounds, and then locked against further adjustment for a different pressure.

For example, valves of this type may be used on hot water storage heaters, in which case it becomes desirable to have on hand valves capable of handling the many varieties and degrees of pressure and temperature conditions encountered in the field for purpose of maximum convenience and also permitting the maintenance of such relief valve inventories at a minimum because of the flexibility in being able to change the stock valves embodying this invention to suit particular conditions encountered in the field.

Another object lies in the provision for a valve in which the pressure setting may be easily accomplished, but one in which the valve may then be locked quickly and effectively against subsequent tampering.

Other objects and advantages will become more readily apparent upon proceeding with the description read in light of the accompanying drawings, in which:

Fig. 1 is a sectional assembly view of a preferred embodiment of our invention.

Fig. 2 is a transverse sectional view taken on the line 2—2 of Fig. 1.

Fig. 3 is a sectional view taken on line 3—3 of Fig. 1.

Figs. 4 and 5 are fragmentary exterior views showing the manner in which the respective valve set pressure ratings are sight arranged.

Similar reference numerals refer to similar parts throughout the several views.

Referring to Fig. 1, a body or casing generally designated 1 is provided with the usual inlet 2 and the discharge outlet 3 having the valve chamber 4 therebetween to receive a pressure responsive closure member 5 having a peripherally fluted portion 6 for enabling fluid flow therepast and also providing for close guiding on the cylindrical wall 7 of the chamber 4 during the reciprocating movement of the closure member 5. The said closure member at its lowermost end or seating portion is preferably, although not necessarily, provided with a composition disc insert 8 for the fluid sealing contact with the casing 1. At a central portion thereof, a chamber 9 is arranged for receiving a fusible material 11, such as pure Banca tin, for example, which has a relatively low melting temperature, so that in the event of encountering excessively high temperatures, say, due to a shortage of water and forming a high pressure steam condition within the boiler or pressure vessel, the Banca tin will melt and thus permit the relieving discharge of the relatively high pressure fluids into atmosphere by means of the transverse outlet aperture shown communicating with the passage 3. The O-ring 13 seals the member 16 relative to its mounting within the bonnet 15. The closure member 5 is held to its seat by the resilient means provided by a suitably selected coiled spring 14. Thus far, it should be understood that the structural description has been concerned with a valve device which alone considered is not a part of this invention.

Primarily, however, and as a feature having significant utility, the instant valve comprises a construction embodying a bonnet generally formed by means of the screw threaded members 15 and 16 in which a third member, such as an adjusting screw stem 17 is threaded into the inner member 16 through the bottom as indicated. The outer portion of the bonnet 15 is fastened to the body whereby to close off the valve chamber 4 and thus place the spring 14, bearing at its upper end against the washer 10, under its initial compression.

To fully appreciate the significance of this invention, it must be understood that due to variations of the spring material itself and also because of manufacturing tolerances, it is desirable that additional means for contracting and effecting the desired compression of the spring member 14 be provided. This is also desirable in order to obtain a truly accurate setting of the valve in the field, while at the same time overcoming the shortcomings referred to.

This convenient adjustment has been accomplished in this case by providing a small Allen-head screw 17 inside the stem 16 whereby the adjustment of this set screw on the valve to obtain the proper pressure seating can be made from outside the valve without need for removing the outer bonnet member 15 and its sub-assembly.

It should be understood that a set screw wrench (not shown) is insertable through the upper end of the inner threaded member 16, threaded as at 30, whereby to engage the polygonally formed hole 18 in the innermost member, the set screw 17. It will further be appreciated that in establishing the desired fluid pressure at which the valve is to discharge the set screw wrench is turned counterclockwise until the least uninterrupted stream or stready drip of water spills over through the valve outlet 3 which thus represents the set fluid pressure of the valve. At the latter pressure setting, the valve will open. The wrench is then removed and the filler pin 50 substituted having the half round head 20 to prevent any gripping thereof for later inserting a wrench. A spring clip 19 non-rotatably mounted relative to the pin 50 which acts as a locking device against accidental rotation prevents the outer handle 21 from turning say from vibration or the like by engaging serrations 27. The clip 19 also serves as a temporary holding means until the prongs 28 are bent inwardly to engage serrations 27. The said spring clip which is also non-rotatable positioned relative to pin 50 is mounted with its transverse portion 26 supported on top of the stem member 16 as indicated. Each of the members 16, 19 and 21 is non-rotatably mounted with respect to the pin 50 by reason of the polygonal form of the pin shank as more clearly shown in Figs. 2 and 3. The shrouded form of handle 21 is positioned over the spring clip and is so rotatably arranged that the open slot or window 31, better shown in Figs. 3 to 5 inclusive, is turned until it is in alignment with the set pressure markings, such as at the pressure designations 50 or 125 respectively, at 22 and 25 in Figs. 4 and 5. The pin 50 is then inserted to prevent rotative movements of the members 16, 19 and 21 and then the prongs 28 are bent inwardly to engage the serrations 27 to prevent rotative movement between the members 19 and 15. It should, of course, be understood that intermediate pressure valve settings, such as 75 and 100 pounds are easily provided for by suitable rotation of the threaded adjustment member 17 to effect the desired compression of the spring 14.

It will be noted that the bonnet member 15 is provided with said panels on its periphery for designating the numerals 50 and 125 respectively, or any other pressure designations, which, as shown in comparing Figs. 4 and 5 may be in different planes on the surface 29 to accommodate the varying axial positions of adjusting members 16 and 17 in setting the relieving pressure.

After the valve setting has been established for the discharge pressure desired, the prongs 28, oppositely disposed on the handle 21 are forced inwardly as shown more clearly in Fig. 2 to engage the serrations 27, thereby locking members 16 and 15 against relative rotation.

As shown in Fig. 3, panels 22, 23, 24 and 25 are spaced peripherally equidistant apart on member 15 for the designation of the pressure settings 50, 75, 100 and 125 pounds respectively. To obtain uniform pressure responsive settings of the valve, a datum line or control point has been established which control point is based upon the back seating of the pressure adjusting member 16 into the bonnet 15 and since such relative axial position always remains the same identical axial adjustment for the said adjusting member 16 for the various pressures encountered is obtained.

For example, as shown in Fig. 5, after the valve has been set to the desired pressure or control point, such as 125 pounds, the cap 21 is then positioned so that its window 31 corresponds with the selected panel (125) thus establishing said control point. The valve is then locked by means of said filler pin 50, as shown more clearly in Fig. 1. Subsequent rotation of the handle 21 will produce the pressure settings in the increments illustrated.

Compactness and security in the locking mechanism is obtained by having the outer upper portion of the bonnet 15 provided with the serrations 27 for engagement by the turned-in portions 28 of the handle 21.

Ease and convenience of pressure application and also legibility of such pressure setting is effected by the upper shank of the bonnet, as at 29, being provided with the said panels, which are visible through the opening or window 31 of the cap handle 21.

It should now be clear that an authorized operator in the field can easily adjust the valve to the desired pressure setting, that is varying say from 50 lbs. to 125 lbs. fluid pressure, for example. The proper pressure panel or plate will show through the handle aperture as at Figs. 4 and 5 through the window to indicate accurately the set relief pressure of the valve.

It should further be understood that while a single embodiment of our invention has been shown and described this is for purpose of example only, since the invention is capable of many forms. The scope of the invention should be measured by the appended claims.

We claim:

1. In an adjustable relief valve, the combination of a valve casing, a pressure responsive closure member therefor, screw-threaded mounted members threadedly connected to the casing at an upper opening therewithin, resilient means for biasing said closure member, one of said screw-threaded mounted members being rotatably mounted in sealed relation to the other of said screw-threaded mounted members, means exterior of the said screw-threaded mounted members for adjusting said resilient means, said exterior means cooperating with an apertured portion of the inner one of said screw-threaded mounted members including a cap mounted on the inner one of said screw-threaded mounted members, means overlying the said cap extending through a central apertured portion thereof for holding one of said latter screw-threaded members in non-rotatable relation to the other of said screw-threaded mounted members.

2. In an adjustable relief valve, the combination of a valve casing, a pressure responsive closure member therefor, screw-threaded mounted members for said casing, resilient means for biasing said closure member, one of said screw-threaded mounted members being mounted in sealed relation to the other of said screw-threaded mounted members, means exterior of the said screw-threaded mounted members for adjusting said resilient means, screw means within the inner one of said screw-threaded mounted members contacting said resilient means, the said inner screw-threaded mounted member having a central aperture cooperating with the exterior adjusting mean, said exterior means including a cap mounted on one of said screw-threaded mounted members, and means for holding one of said latter members in non-rotatable relation to the other screw-threaded mounted member, the said screw means being mounted within the central aperture of the said inner screw-threaded mounted member.

3. In an adjustable relief valve, the combination of a valve casing, a pressure responsive closure member therefor, screw-threaded mounted members for said casing, resilient means for biasing said closure member, one of said screw-threaded mounted members being apertured and mounted in annularly sealed relation to the other of said screw-threaded mounted members, means accessible exteriorly of the said screw-threaded mounted members for adjusting said resilient means including a cap and an adjusting screw mounted at an inner end portion of one of said screw-threaded mounted members, and peripheral means on the cap for holding one of said latter members in non-rotatable relation to the other of said screw-threaded mounted member, the said adjusting screw having an upper portion engageable by suitable tool means through the aperture of said screw-threaded mounted member.

4. In an adjustable relief valve, the combination of a valve casing, a pressure responsive closure member therefor, screw-threaded mounted members in an upper portion of said casing, resilient means for biasing said closure member, an adjusting screw for the resilient means, one of said screw-threaded mounted members being apertured and being mounted in sealed relation to the other of said screw-threaded mounted members, the said adjusting screw having means engageable by a wrench or the like tool, means exterior of the said screw-threaded mounted members for adjusting the said screw, said exterior means including a cap mounted on one of said screw-threaded mounted members and having bendable means for holding one of said latter members in non-rotatable relation to the other screw-threaded mounted members, the said adjusting screw being engageable by the wrench through the aperture of said screw-threaded mounted member.

5. In an adjustable relief valve, the combination of a valve casing, a pressure responsive closure member therefor, screw-threaded mounted members for said casing within an upper opening thereof, resilient means for biasing said closure member, one of said screw-threaded mounted members being mounted in sealed relation to the other of said screw-threaded mounted members, means accessible exteriorly of the said screw-threaded mounted members for adjusting said resilient means, said exterior means including a shrouded handle mounted on one of said screw-threaded mounted members having distortable side disposed means for holding one of said latter members in non-rotatable relation to the other screw-threaded mounted member, the said handle having locking means to prevent rotation of the inner screw-threaded mounted member in either direction after adjustment of said resilient means is completed.

6. In an adjustable relief valve, the combination of a valve casing, a pressure responsive closure member therefor, screw-threaded mounted members for said casing, resilient means for biasing said closure member, one of said screw-threaded mounted members being mounted in sealed relation to the other of said screw-threaded mounted members, means exterior of the said screw-threaded mounted members for adjusting said resilient means, said exterior means including a cap with a cut away portion engageable with the outer one of said screw-threaded mounted members and mounted on the inner one of said screw-threaded mounted members, the said cap having means for holding one of said latter members in non-rotatable relation to the other screw-threaded mounted member, an inner screw for contacting said resilient means, the said screw being positioned in the inner one of said screw-threaded mounted members, the said latter member holding said cap against relative rotation to lock said screw against rotation.

7. In an adjustable relief valve, the combination of a valve casing, a pressure responsive closure member therefor, screw-threaded mounted members for said casing, resilient means for biasing said closure member, one of said screw-threaded mounted members being mounted in sealed relation to the other of said screw-threaded mounted members, an inner screw for the resilient means, means exterior of the said screw-threaded mounted members for adjusting said inner screw, said exterior means including a handle with an annular depending portion mounted on one of said screw-threaded mounted members, and means engageable with said annular depending portion for holding one of said latter members in non-rotatable relation to the other screw-threaded mounted member, the said annular depending portion having a transversely ported section for establishing the setting of the said inner screw for adjustment of the said resilient means.

References Cited in the file of this patent

UNITED STATES PATENTS

| | | |
|---|---|---|
| 402,702 | Warren | May 7, 1889 |
| 858,810 | Hanson | July 2, 1907 |
| 1,212,102 | Pipe | Jan. 9, 1917 |
| 2,479,620 | Ingham | Aug. 20, 1949 |

FOREIGN PATENTS

| | | |
|---|---|---|
| 488 | Great Britain | Jan. 12, 1915 |
| 328,786 | Great Britain | May 8, 1930 |
| 988,170 | France | Apr. 25, 1951 |